United States Patent
Sekiguchi

(10) Patent No.: US 9,111,571 B2
(45) Date of Patent: Aug. 18, 2015

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Tomohiro Sekiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/072,280

(22) Filed: Nov. 5, 2013

(65) Prior Publication Data

US 2014/0133835 A1   May 15, 2014

(30) Foreign Application Priority Data

Nov. 12, 2012  (JP) .................................. 2012-248415

(51) Int. Cl.
*H04N 5/76* (2006.01)
*G11B 27/031* (2006.01)
*G11B 27/34* (2006.01)

(52) U.S. Cl.
CPC .............. *G11B 27/031* (2013.01); *G11B 27/34* (2013.01)

(58) Field of Classification Search
None
See application file for complete search history.

(56) References Cited

U.S. PATENT DOCUMENTS

| 2006/0171048 A1* | 8/2006 | Park ................................ 360/13 |
| 2010/0161587 A1* | 6/2010 | Sullivan ......................... 707/709 |
| 2014/0056575 A1* | 2/2014 | Hamada et al. ............... 386/282 |
| 2014/0101551 A1* | 4/2014 | Sherrets et al. ............... 715/723 |

FOREIGN PATENT DOCUMENTS

JP   2010-183248 A   8/2010

* cited by examiner

*Primary Examiner* — William C Vaughn, Jr.
*Assistant Examiner* — Eileen Adams
(74) *Attorney, Agent, or Firm* — Cowan, Liebowitz & Latman, P.C.

(57) ABSTRACT

An image processing apparatus for processing a plurality of moving image files each including moving image data relating to continuity of time between the moving image data other moving image file, performs an editing process for deleting a portion of the moving image data of one scene including a plurality of the moving image files, and changes the identification information of the moving image file in accordance with the editing process, wherein in accordance with the editing process for deleting a portion of the moving image data of the one scene being performed, the identification information of at least one of the plurality of moving image files included in the one scene is changed.

15 Claims, 16 Drawing Sheets

| TYPE | LENGTH (BYTE) | CONTENT |
|---|---|---|
| UniqueID | 16 | VALUE UNIQUE TO FILE |
| Next ID | 16 | UID OF NEXT FILE 0: END FILE |
| Pre ID | 16 | UID OF PRECEDING FILE 0: TOP FILE |

| MOVING IMAGE FILE (FILE NAME) | UID | NID | PID |
|---|---|---|---|
| MOVING IMAGE FILE 301 (MVI_0001.MP4) | 1111 | 1112 | 0000 |
| MOVING IMAGE FILE 302 (MVI_0002.MP4) | 1112 | 1113 | 1111 |
| MOVING IMAGE FILE 303 (MVI_0003.MP4) | 1113 | 1114 | 1112 |
| MOVING IMAGE FILE 304 (MVI_0004.MP4) | 1114 | 0000 | 1113 |

1302

| MOVING IMAGE FILE (FILE NAME) | UID | NID | PID |
|---|---|---|---|
| - (DELETED) | - (DELETED) | - (DELETED) | - (DELETED) |
| MOVING IMAGE FILE 302 (MVI_0002.MP4) | 1112 | 1113 | 00000 |
| MOVING IMAGE FILE 303 (MVI_0003.MP4) | 1113 | 1114 | 1112 |
| MOVING IMAGE FILE 304 (MVI_0004.MP4) | 1114 | 0000 | 1113 |

1303

| MOVING IMAGE FILE (FILE NAME) | UID | NID | PID |
|---|---|---|---|
| MOVING IMAGE FILE 301 (MVI_0001.MP4) | 1111 | 1112 | 0000 |
| MOVING IMAGE FILE 302 (MVI_0002.MP4) | 1112 | 1113 | 1111 |
| MOVING IMAGE FILE 303 (MVI_0003.MP4) | 1113 | 0000 | 1112 |
| - (DELETED) | - (DELETED) | - (DELETED) | - (DELETED) |

1304

| MOVING IMAGE FILE (FILE NAME) | UID | NID | PID |
|---|---|---|---|
| - (DELETED) | - (DELETED) | - (DELETED) | - (DELETED) |
| MOVING IMAGE FILE 302 (MVI_0002.MP4) | 1112 | 1113 | 0000 |
| MOVING IMAGE FILE 303 (MVI_0003.MP4) | 1113 | 0000 | 1112 |
| - (DELETED) | - (DELETED) | - (DELETED) | - (DELETED) |

| MOVING IMAGE FILE (FILE NAME) | UID | NID | PID |
|---|---|---|---|
| MOVING IMAGE FILE 1501 (MVI_0001.MP4) | 1111 | 1112 | 0xFFFF |
| MOVING IMAGE FILE 1502 (MVI_0002.MP4) | 1112 | 1113 | 0xFFFF |
| MOVING IMAGE FILE 1503 (MVI_0003.MP4) | 1113 | 1114 | 0xFFFF |
| MOVING IMAGE FILE 1504 (MVI_0004.MP4) | 1114 | 0000 | 0xFFFF |

1702

| MOVING IMAGE FILE (FILE NAME) | UID | NID | PID |
|---|---|---|---|
| - (DELETED) | - (DELETED) | - (DELETED) | - (DELETED) |
| MOVING IMAGE FILE 1502 (MVI_0002.MP4) | 1112 | 1113 | 0xFFFF |
| MOVING IMAGE FILE 1503 (MVI_0003.MP4) | 1113 | 1114 | 0xFFFF |
| MOVING IMAGE FILE 1504 (MVI_0004.MP4) | 1114 | 0000 | 0xFFFF |

1703

| MOVING IMAGE FILE (FILE NAME) | UID | NID | PID |
|---|---|---|---|
| MOVING IMAGE FILE 1501 (MVI_0001.MP4) | 1111 | 1112 | 0xFFFF |
| MOVING IMAGE FILE 1502 (MVI_0002.MP4) | 1112 | 1113 | 0xFFFF |
| MOVING IMAGE FILE 1503 (MVI_0003.MP4) | 1113 | 0000 | 0xFFFF |
| - (DELETED) | - (DELETED) | - (DELETED) | - (DELETED) |

1704

| MOVING IMAGE FILE (FILE NAME) | UID | NID | PID |
|---|---|---|---|
| - (DELETED) | - (DELETED) | - (DELETED) | - (DELETED) |
| MOVING IMAGE FILE 1502 (MVI_0002.MP4) | 1112 | 1113 | 0xFFFF |
| MOVING IMAGE FILE 1503 (MVI_0003.MP4) | 1113 | 0000 | 0xFFFF |
| - (DELETED) | - (DELETED) | - (DELETED) | - (DELETED) |

IMAGE PROCESSING APPARATUS, IMAGE PROCESSING METHOD, AND PROGRAM

BACKGROUND OF THE INVENTION

1. Field of the Invention

The present invention relates to an image processing apparatus and, more particularly, to an editing of a moving image file.

2. Description of the Related Art

In the related arts, a recording apparatus for recording a moving image signal and an audio signal into a recording medium has been known. In such a kind of recording apparatus, recorded moving image and audio are managed as files in accordance with a predetermined file system. As a recording construction, there has also been proposed a recording arrangement which records a file of a moving image and audio in such a manner that the file is divided during the recording of the moving image and audio so that a size of the file does not exceed an upper limit size prescribed by the file system (for example, refer to Japanese Patent Application Laid-Open No. 2010-183248).

An apparatus having an editing function for deleting a recorded moving image file or partially deleting a portion before or after a designated position of the moving image file is also known.

As mentioned above, for a time interval from a recording start instruction by the user up to a recording stop instruction, each time the size of the file which is being recorded reaches an upper limit size, the file is divided and recorded. However, since the files which are divided and recorded in the photographing of one time are respectively managed as independent files, the user cannot easily recognize that they are associated files, so that it is very inconvenient.

SUMMARY OF THE INVENTION

In consideration of the foregoing problems, it is an aspect of the invention to realize an editing method whereby a plurality of files are formed during the recording of one scene and an association among those files is set as association information, so that a relationship among the files is held and updated upon editing.

In the invention, an image processing apparatus for processing a plurality of moving image files each including moving image data relating to continuity of time between the moving image data other moving image file, performs an editing process for deleting a portion of the moving image data of one scene including a plurality of the moving image files, and changes the identification information of the moving image file in accordance with the editing process, wherein in accordance with the editing process for deleting a portion of the moving image data of the one scene being performed, the identification information of at least one of the plurality of moving image files included in the one scene is changed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 13 is a diagram illustrating identification information of the moving image files according to the first embodiment of the invention.

FIG. 17 is a diagram illustrating identification information of the moving image files according to the second embodiment of the invention.

DESCRIPTION OF THE EMBODIMENTS

Various exemplary embodiments, features, and aspects of the present invention will be described in detail below with reference to the drawings.

First Embodiment

Construction of Devices

Figure 1:
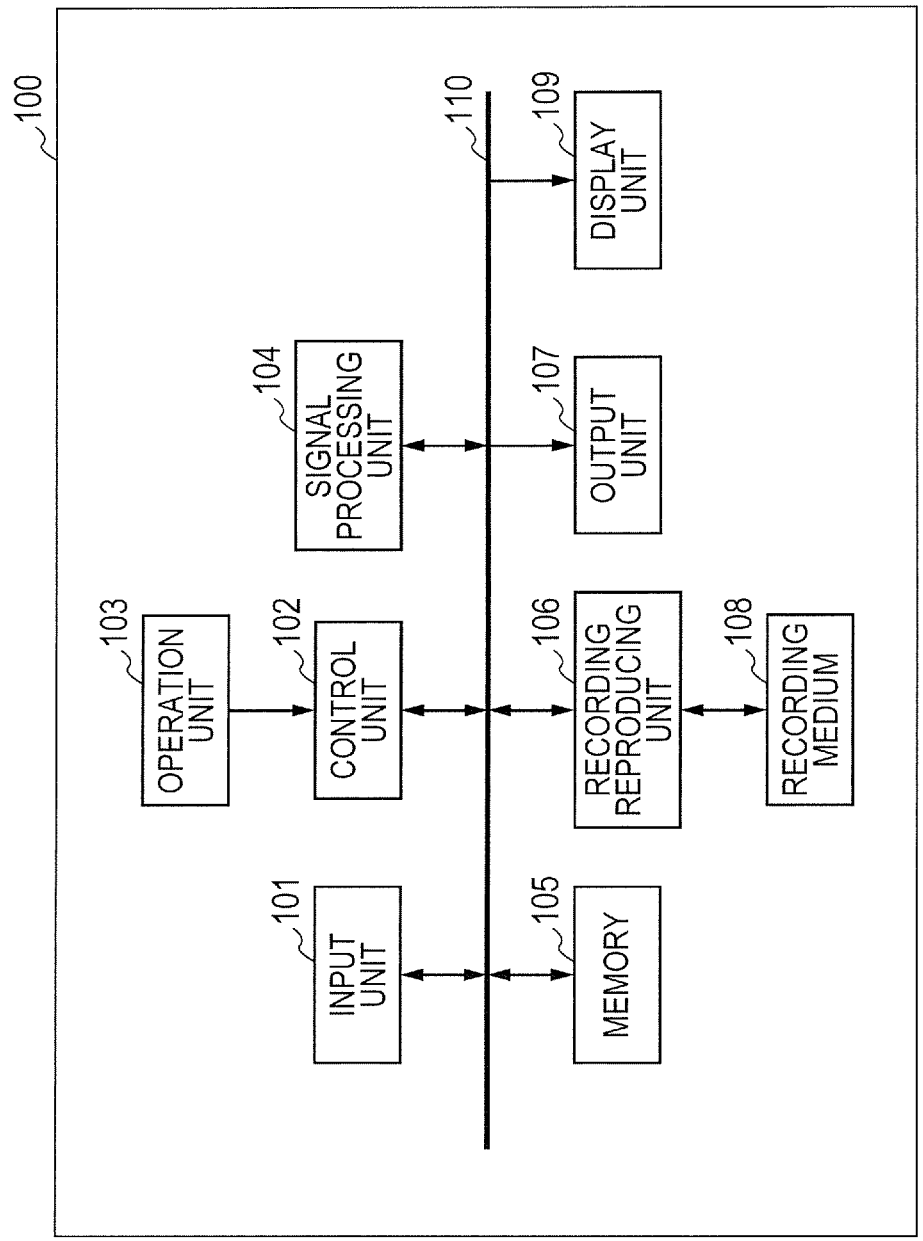
FIG. 1 is a block diagram illustrating an example of a construction of a recording apparatus according to an embodiment of the invention.

FIG. 1 is a block diagram illustrating an example of a construction of a recording apparatus 100 according to an embodiment of the invention.

In FIG. 1, an input unit 101 obtains moving image data and audio data and outputs them. In the present embodiment, although the input unit 101 inputs the moving image data and audio data supplied from the outside of the recording apparatus 100, the input unit 101 may include an image pickup unit and a microphone and may obtain a photographed moving image and audio data generated by the microphone. For example, the image processing construction of the invention can be also applied to a recording reproducing processing construction of the photographed moving image data in an image pickup apparatus such as a video camera.

A control unit 102 controls the whole operation of the recording apparatus 100 in accordance with an input from an operation unit 103. The control unit 102 includes a microcomputer, a memory, and the like and controls the recording apparatus 100 in accordance with a computer program (software) stored in a nonvolatile memory (not shown). The control unit 102 has a recording medium interface for communicating data and commands with a recording reproducing unit 106. The operation unit 103 includes various kinds of switches which can be operated by the user. Thus, the operation unit 103 receives various kinds of instructions and the like by the user and notifies the control unit 102 of them. The operation unit 103 also includes a power switch, switches for instructing a start and stop of the recording, a switch for changing over a mode of the recording apparatus 100, and the like.

In recording, in accordance with a well-known coding format such as MPEG or the like, a signal processing unit 104 codes the moving image data and audio data which are input by the input unit 101 and compresses their information amounts. Further, the signal processing unit 104 executes processes necessary to record the moving image data and audio data and outputs information of code amounts (data amounts) of the coded moving image data and audio data to the control unit 102. In reproduction, the signal processing unit 104 decodes the reproduced moving image data and audio data and expands their information amounts.

A memory 105 stores the moving image data and audio data. Each block of the recording apparatus 100 processes the moving image data and audio data by accessing the memory 105. Besides the moving image data and audio data, the memory 105 stores various kinds of information such as information of the file system, management information, and the like and, further, plays a role of a work memory for control by the control unit 102 or the like.

The recording reproducing unit 106 writes or reads out the moving image data and audio data or the various kinds of information into/from a recording medium 108. In recording, the recording reproducing unit 106 writes the moving image data and audio data stored in the memory 105 into the recording medium 108. In reproduction, the recording reproducing unit 106 reads out the moving image data and audio data from the recording medium 108 and stores into the memory 105. In the present embodiment, the recording medium 108 is a random access recording medium such as hard disk (HD), flash memory card, or the like.

The recording reproducing unit 106 manages the moving image data and audio data and the various kinds of information which are recorded in the recording medium 108 as files in accordance with a file system such as FAT (File Allocation Table) or the like. The recording reproducing unit 106 has a well-known interface (IF) such as ATA (AT Attachment) or the like and communicates data and various kinds of commands with a recording medium IF in the control unit 102. Although the recording medium 108 is constructed so that it can be easily loaded and unloaded to/from the recording apparatus 100 by a loading and unloading mechanism (not shown), each recording medium 108 may be built in the recording apparatus 100.

In the case of writing and reading out a moving image file including the moving image data and audio data into/from the recording medium 108, the control unit 102 controls the recording reproducing unit 106, reproduces file system data (management data) from the recording medium 108, and stores into the memory 105. The file system data is data showing a file name, a file size, a recording address, and the like of the data recorded in the recording medium 108 and is information to manage the file. The control unit 102 controls the writing and reading-out of the file in accordance with the read-out file system data. In accordance with the writing of the file into the recording medium 108, the control unit 102 updates the file system data stored in the memory 105. The updated file system data is recorded into the recording medium 108 by the recording reproducing unit 106.

In the present embodiment, a UUID (Universal Unique IDentifier) is added to the moving image file which is recorded into the recording medium 108 and records. UUID is identification information for uniquely identifying each moving image file. Each time a moving image file is formed, the control unit 102 generates a UUID of a different value. Therefore, by confirming the value of UUID recorded in the recording medium 108, each moving image file can be easily identified.

By operating the operation unit 103, the user can instruct a change-over of an operation mode of the recording apparatus 100, a recording start or stop of the moving image data, or the like. An output unit 107 outputs the reproduced moving image data and audio data to an external display apparatus or the like of the recording apparatus 100. A display unit 109 displays a moving image and various kinds of information to a display apparatus such as a liquid crystal panel or the like. A data bus 110 is used to transmit and receive data, various kinds of control commands, and the like to/from each unit of the recording apparatus 100.

Recording Operation

Subsequently, the recording operation in the embodiment will be described. First, when the instruction to shift the operation mode to the recording mode of the moving image data is received from the operation unit 103, the recording apparatus 100 is shifted to a recording standby state and the control unit waits for the recording start instruction. In the recording standby state, the moving image corresponding to the moving image data which is input from the input unit 101 is displayed to the display unit 109. When the recording start instruction is input from the operation unit 103, the signal processing unit 104 reads out the moving image data which is input by the input unit 101 and stored in the memory 105 and starts the coding of the moving image data. The coded data is stored into the memory 105 by the signal processing unit 104.

In the present embodiment, a data rate of the data coded by the signal processing unit 104 is lower than a data rate at which the data can be recorded into the recording medium 108. Therefore, in the present embodiment, the coded data is temporarily stored into the memory 105. Each time a data amount of the coded data stored in the memory 105 reaches a first predetermined amount, the recording reproducing unit 106 reads out the coded data from the memory 105 and records into the recording medium 108. At a point of time when the coded data stored in the memory 105 decreases to a second predetermined amount smaller than the first predetermined amount, the read-out of the coded data from the memory 105 is temporarily stopped and a recording process to the recording medium 108 is interrupted. In this manner, the process is repeated. At this time, if the file is not opened, a file to record the coded data is newly formed and opened and the coded data is recorded as a moving image file.

Each time the writing of one time into the recording medium is finished, the control unit 102 updates the file system data (management information) stored in the memory 105 on the basis of a recording position or the like of the coded data which is written this time. The control unit 102 controls the recording reproducing unit 106, reads out the updated file system data from the memory 105, and records into the recording medium.

The control unit 102 combines an individual number of the recording apparatus 100, recording time/day, the total number of recording times from the start of use in the recording apparatus, random numbers which are prepared, and the like and generates a UUID having a value of a predetermined bit length. This UUID is added to a management information area of the moving image file as will be described hereinafter as identification information (unique ID) peculiar to the file and is recorded. The control unit 102 receives the recording start instruction and generates a UUID of a different value each time a moving image file is newly formed.

Figures 4, 5:
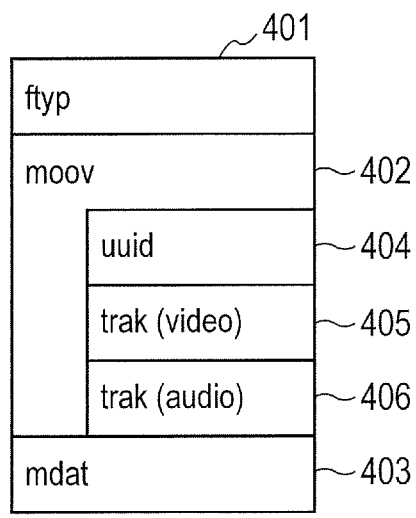
FIG. 4 is a diagram illustrating a construction of a moving image file.
FIG. 5 is a diagram illustrating a construction of identification information.

In the present embodiment, the moving image file is recorded in accordance with an MP4 file format. FIG. 4 is a diagram illustrating an example of a construction of the MP4 file. MP4 has a tree structure as illustrated in FIG. 4 and has elements called boxes.

In the box of the top layer, an "ftyp" box, an "moov" box, and an "mdat" box exist. Interchangeability information is stored into "ftyp" 401. Management information regarding the moving image data and audio data is stored into "moov" 402. Real data of the moving image data and audio data is stored into "mdat" 403. In recording, the moving image data and audio data are recorded so that those data are additionally written into the "mdat" box.

A plurality of information in a "trak" box 405, a "trak" box 406, and a "uuid" box 404 are stored into "moov". In the present embodiment, an ID (unique ID) peculiar to each moving image file is stored into the "uuid" box 404. Further, in the embodiment, in the case where the moving image file being recorded is closed and a moving image file is newly opened and recorded, information for identifying the file to be opened (hereinbelow, referred to as a "backwardly-continuous file") is formed. At this time, information for identifying the file to be closed (hereinbelow, referred to as a "forwardly-continuous file") is also formed. Those two information are stored into the "uuid" box 404.

FIG. 5 is a diagram illustrating contents of the identification information which is stored into the "uuid" box 404. UniqueID (UID) has a length of 16 bytes and a value peculiar to each moving image file is stored into this UID. Specifically speaking, the value of the foregoing UUID is stored. In the case where a plurality of moving image files are recorded during the recording of one time from the recording start instruction by the user to the recording stop instruction, a value of identification information (UID) of the backwardly-continuous file is stored into NextID (NID). In the case of the end file in the recording of one time, a predetermined value, for example, "0" in this instance is stored. In the case where the predetermined value is stored into this NID, this means that there are no backwardly-continuous files. In the case where a plurality of moving image files are recorded during the recording of one time, a value of identification information of the forwardly-continuous file is stored into PreID (PID). In the case of the top file in the recording of one time, a predetermined value, for example, "0" in this instance is stored. In the case where the predetermined value is stored as a PID, this means that there are no forwardly-continuous files.

In the present embodiment, the control unit 102 monitors the size of the file being recorded by a notification from the recording reproducing unit 106 or the signal processing unit 104. If the size of the file being recorded reaches a threshold value (file division threshold value) to determine whether or not the file is divided, the control unit closes the file being recorded, newly generates (opens) a moving image file, and continues the recording. In the present embodiment, the file division threshold value is determined on the basis of an upper limit of the file size decided by the file system. That is, in the present embodiment, the file division threshold value is set to a value which is smaller than the upper limit of the file size by a predetermined value.

In the case where an FAT32 file system is used, since there is such a restriction that the maximum value of one file size is equal to 4 gigabytes (GB), the file division threshold value is set to a predetermined value which is smaller than 4 GB as an upper limit.

If the file size reaches the file division threshold value during the recording, the control unit 102 instructs the recording reproducing unit 106 so as to close the file which is currently opened, open a new file, and continue the recording of the coded data. As mentioned above, each time the file size reaches the file division threshold value during the recording of the moving image, the recording is continued while dividing the file.

When the recording stop instruction is received from the operation unit 103 during the recording of the moving image, the control unit 102 stops the coding of the moving image data which is executed by the signal processing unit 104 and closes the file being recorded by the recording reproducing unit 106. In response to it, the control unit 102 instructs the recording reproducing unit 106 so as to change the contents of the file system data and record into the recording medium.

Figure 2:
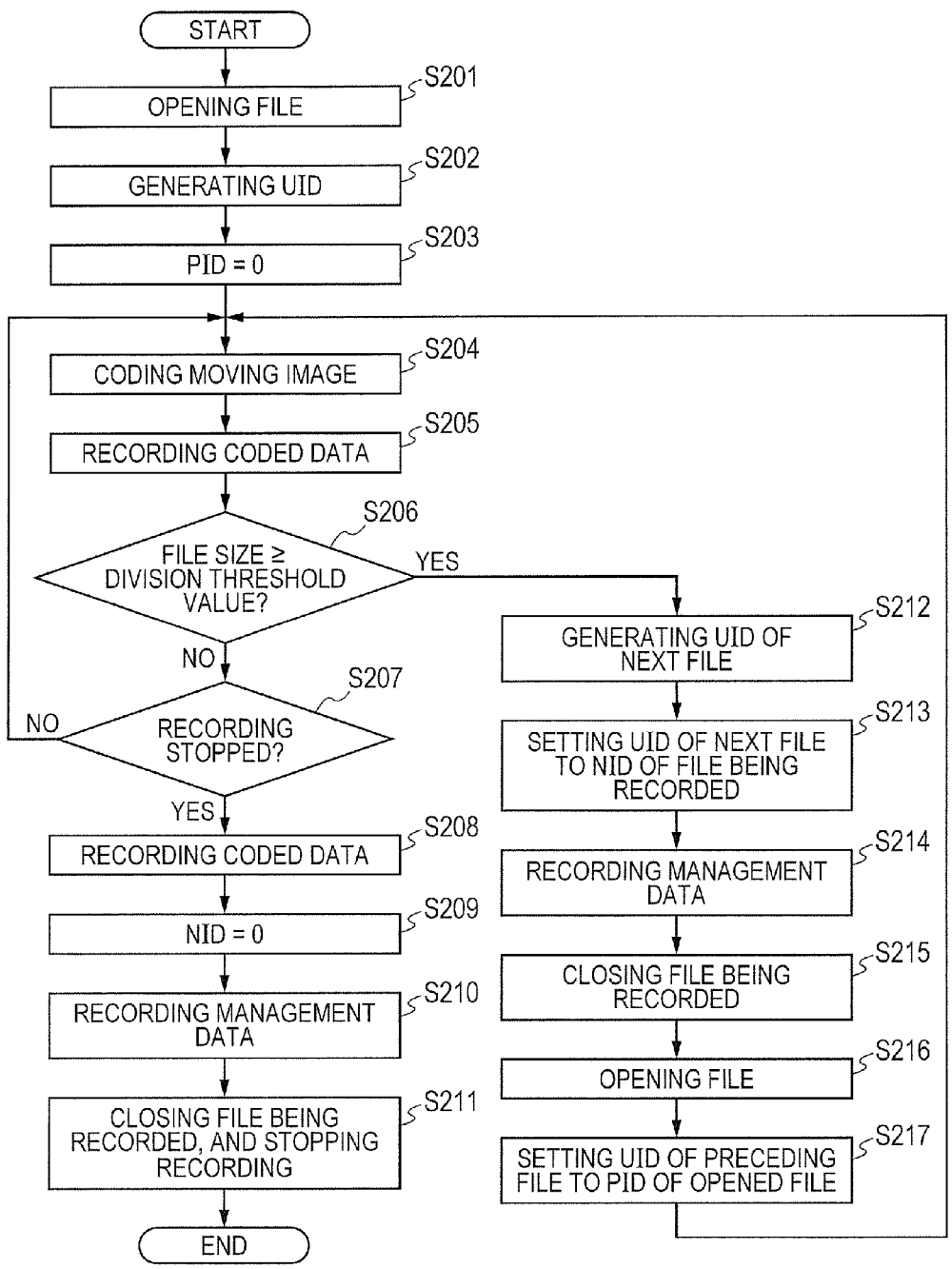
FIG. 2 is a flowchart for the recording operation according to the first embodiment of the invention.

The recording operation will be described hereinbelow with reference to a flowchart of FIG. 2. The operation of FIG. 2 is executed by a method whereby the control unit 102 controls each unit. When the recording start instruction is received from the operation unit 103 in the recording standby state, the operation of FIG. 2 is started. First, the control unit 102 instructs the recording reproducing unit 106 so as to open the moving image file (S201). Subsequently, the control unit 102 generates identification information (UID) of the moving image file which is formed this time and stores into the memory 105 (S202). The control unit 102 sets "0" as a PID of the moving image file which is recorded this time and stores into the memory 105 (S203).

Subsequently, the control unit 102 controls the signal processing unit 104 so as to start the coding of the moving image data and audio data (S204) and stores the coded data into the memory 105. The control unit 102 instructs the signal processing unit 104 so as to reduce a top frame after the start of the recording and generate a thumbnail image (representative image). The signal processing unit 104 reduces the top frame, generates thumbnail image data, and stores into the memory 105.

When a data amount of the unrecorded coded data stored in the memory 105 reaches a threshold value for writing, the control unit 102 instructs the recording reproducing unit 106 so as to write the data. The recording reproducing unit 106 reads out the coded data from the memory 105 and records into the recording medium 108 (S205). When the data amount of the unrecorded coded data stored in the memory 105 is smaller than a threshold value for stopping the writing, the control unit 102 instructs the recording reproducing unit 106 so as to stop the writing, thereby temporarily stopping the writing of the coded into the recording medium 108.

When the writing process of one time is finished, the control unit 102 discriminates whether or not the size of the moving image file which is being currently recorded is equal to or greater than the threshold value for the file division (S206). If the file size does not reach the file division threshold value, the control unit 102 is returned to S204 and continues the recording process (S207).

If the size of the moving image file being recorded is equal to or greater than the file division threshold value in S206, the control unit 102 generates a UID of the next moving image file, stores the UID into the memory 105 (S212), and sets a value of the UID of the next file into an NID of the moving image file which is being currently recorded (S213). The control unit 102 controls the recording reproducing unit 106 so as to store the management data including the UID, NID, PID, and thumbnail image data stored in the memory into the "moov" box, and records into the recording medium 108. The control unit 102 also controls the recording reproducing unit 106 so as to close the moving image file being recorded (S215) and open a new moving image file (S216). As a PID of the moving image file which is newly formed, the UID of the moving image file which is closed immediately before is set and stored into the memory 105, and thereafter, the control unit 102 is returned to S204 and continues the process (S217). Information showing offsets (data amounts) from the top of the file of each predetermined unit of the moving image data and audio data which are stored in the "mdat" box and other data necessary for reproduction are also stored into the "moov" box. In the present embodiment, a file name including the number is added to each file. When a file is newly formed, the file number is increased one by one.

When there is a recording stop instruction in S207, the control unit 102 controls the recording reproducing unit 106 so as to record the unrecorded coded data stored in the memory 105 at that point of time into the recording medium 108 (S208). The control unit 102 sets "0" as an NID of the moving image file which is being currently recorded and stores into the memory 105 (S209). The control unit 102 controls the recording reproducing unit 106, stores the management data including the UID, NID, and PID stored in the memory into the "moov" box, and records into the recording medium 108 (S210). The control unit 102 closes the file being recorded and stops the recording (S211).

Figure 3:
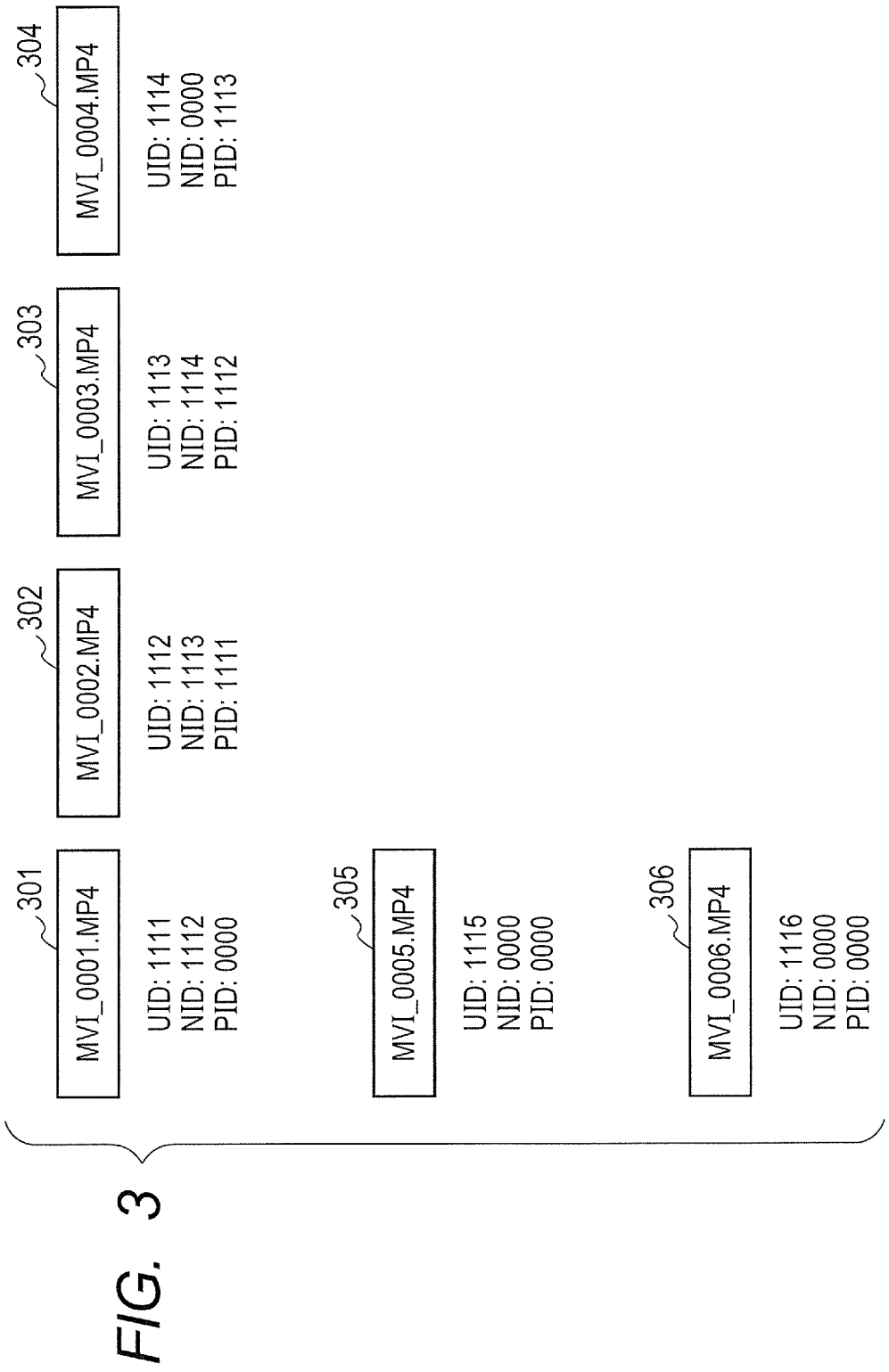
FIG. 3 is a diagram illustrating states of recorded moving image files according to the first embodiment of the invention.

FIG. 3 is a diagram illustrating moving image files which are recorded into the recording medium in the recording apparatus of the present embodiment and the contents of the identification information which is stored into the "uuid" box 404 of each moving image file. Moving image files 301 to 304 in FIG. 3 are moving image files which are recorded for a period of time from the recording start instruction to the recording stop instruction. The moving image file 301 is formed in response to the recording start. When a size of the moving image file 301 reaches the file division threshold value, the file 301 is closed and the file 302 is newly formed. For example, "1111" is stored as a UID of the file 301 and "1112" as a UID of the next file 302 is stored into the NID. Since the file 301 is a top file after the recording start, "0" (0000) is stored into the PID. When a size of the moving image file 302 reaches the file division threshold value, the file 302 is closed and the file 303 is newly formed. "1113" as a UID of the file 303 is stored into the NID of the file 302. "1111" as a UID of the file 301 is stored into the PID of the file 302. When a size of the moving image file 303 reaches the file division threshold value, the file 303 is closed and the file 304 is newly formed. "1114" as a UID of the file 304 is stored into the NID of the file 303. "1112" as a UID of the file 302 is stored into the PID of the file 303. When there is a recording stop instruction during the recording of the moving image file 304, "1113" as a UID of the file 303 is stored as a PID of the file 304. Since the file 304 is an end file in the recording of one time, "0" is stored as an NID.

Moving image files 305 and 306 are moving image files of the case where a plurality of moving image files are not recorded for a period of time from the recording start instruction to the recording stop instruction. The moving image file 305 is formed in response to the recording start. If the recording stop is instructed before a size of the moving image file 305 reaches the file division threshold value, for example, "1115" is stored as a UID and "0" (0000) is stored into the NID and PID, respectively. Similarly, the moving image file 306 is formed in response to the recording start. If the recording stop is instructed before a size of the moving image file 306 reaches the file division threshold value, for example, "1116" is stored as a UID and "0" (0000) is stored into the NID and PID, respectively.

In this manner, in the present embodiment, if a plurality of moving image files are recorded during the recording of one time, the identification information of the immediately-preceding and immediately-following files are stored into the moving image files and recorded. Therefore, a fact that the files are the moving image files recorded in the recording of one time can be easily recognized.

Although the NID of the moving image file being recorded is set at the time of the recording stop or when the file size reaches the file division threshold value in the present embodiment, the NID may be set when the file is formed. For example, when the file is formed, if a UID of the next moving image file can be formed, the UID of the next moving image file is set as an NID and recorded into the recording medium together with the PID. If there is a recording stop instruction during the recording of one time of this moving image file, the value of the NID which is already recorded is changed to a predetermined value (0).

Or, when the file is formed, the value of the NID is set to "0" and recorded together with the PID. When the size of this moving image file reaches the file division threshold value, the value of the NID is changed by the UID of the next moving image file.

Reproducing Operation

Figure 6:
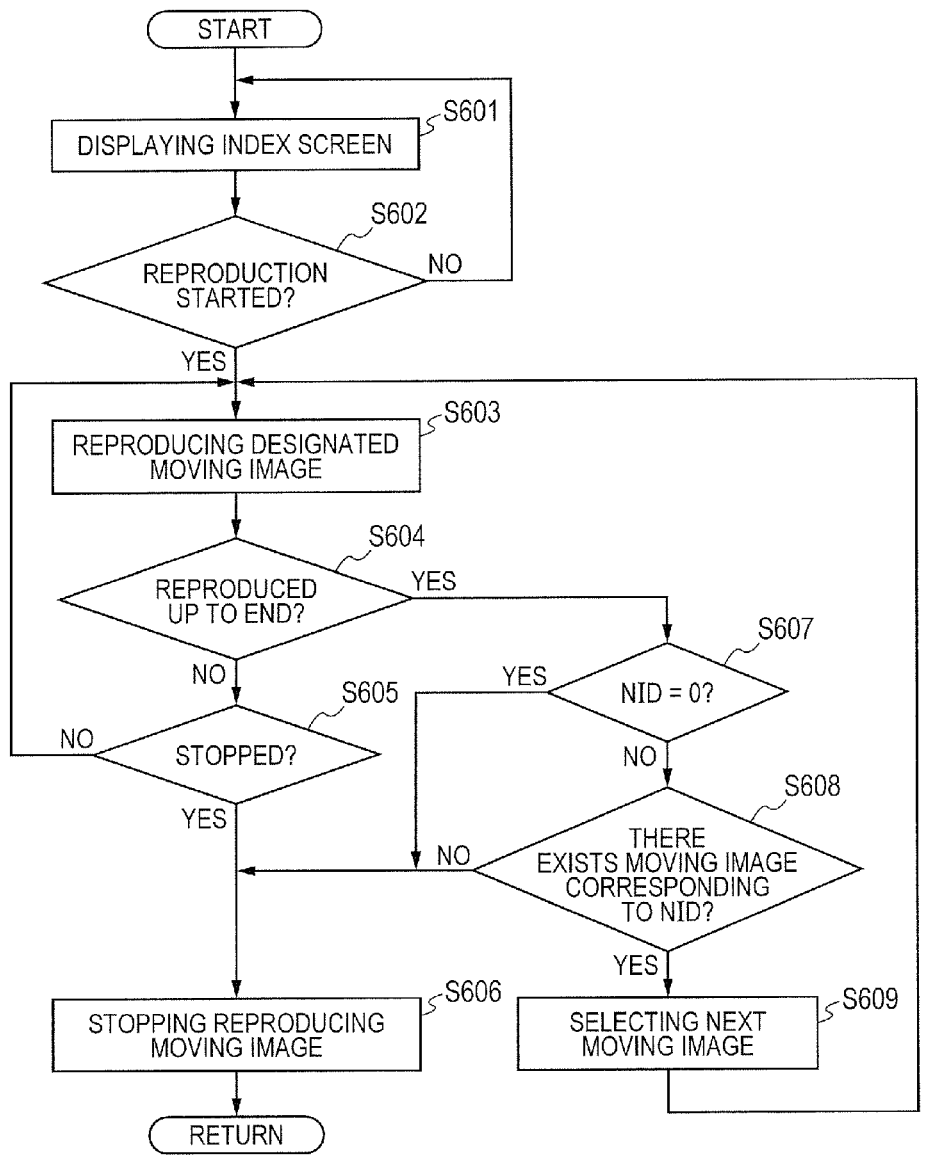
FIG. 6 is a diagram illustrating a flowchart for the reproducing operation according to the first embodiment of the invention.

Subsequently, the operation upon reproduction will be described. FIG. 6 illustrates a flowchart for the reproducing operation. When a change-over instruction of a reproducing mode is output by the operation unit 103, the control unit 102 controls the recording reproducing unit 106 and confirms the values of the NID and PID of the plurality of moving image files recorded in the recording medium 108. On the basis of the NID and PID of each moving image file, the control unit 102 detects the moving image file of one scene recorded by the recording of one time. The control unit 102 instructs the recording reproducing unit 106 so as to read out thumbnail image data of the moving image file of each scene and store into the memory 105. The control unit 102 generates an index screen constructed by the thumbnail image of the scene of each moving image file and displays to the display unit 109 (S601).

For example, the moving image files 301 to 304 in FIG. 3 are files constructing one scene recorded by the recording of one time. Therefore, the control unit 102 does not display all of the thumbnail images of those four files but displays one of them, for example, the thumbnail image of the file 301 as a head of the scene so that the displayed thumbnail image can be selected, and inhibits the display of the thumbnail images of the other files. Information showing that one scene includes a plurality of moving image files is also displayed together.

Figure 8:
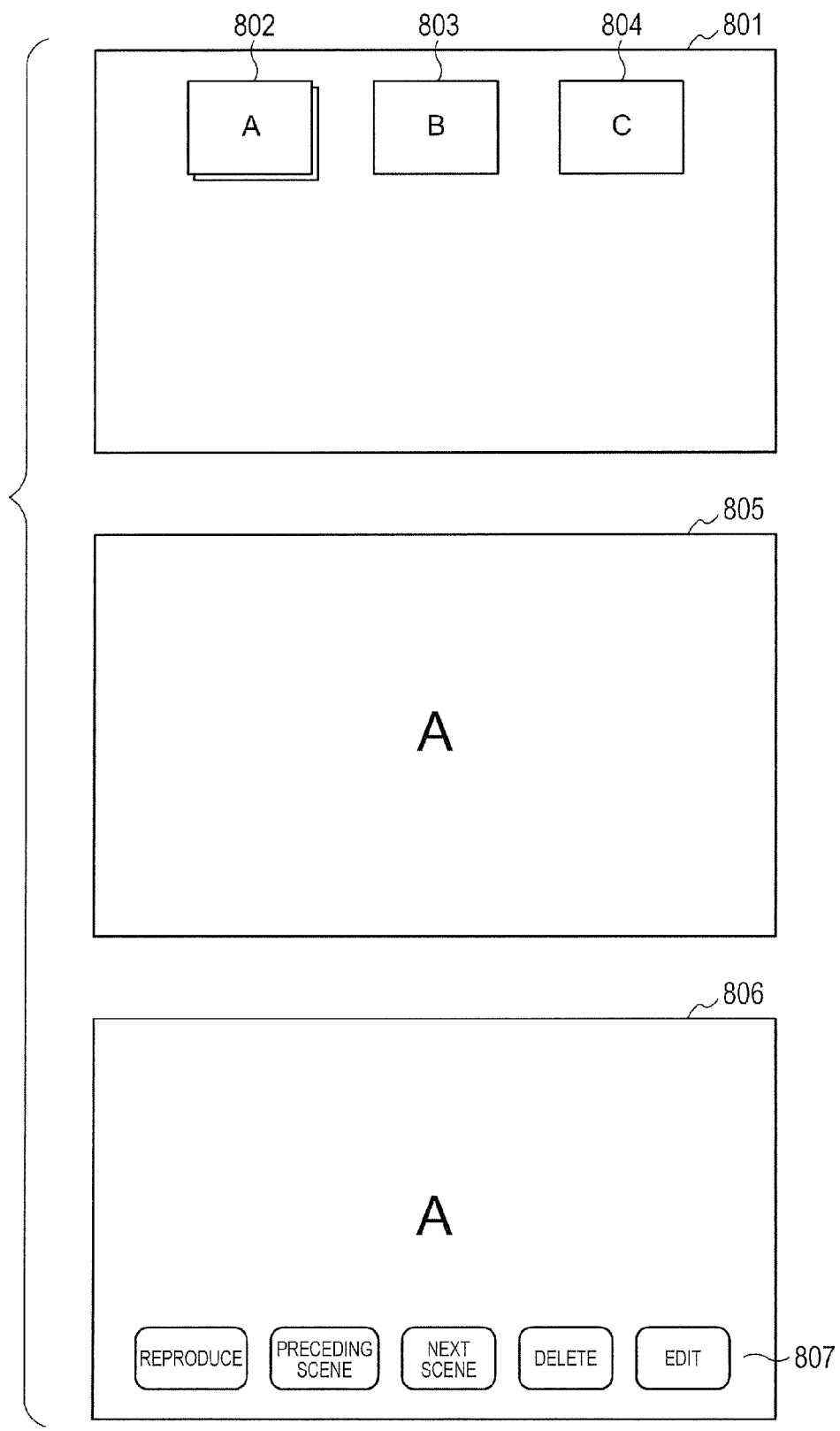
FIG. 8 is a diagram illustrating a display screen in the editing operation according to the first embodiment of the invention.

For example, a display example of an index screen of each moving image file shown in FIG. 3 is illustrated in FIG. 8. In an index screen 801 in FIG. 8, a thumbnail image 802 is a thumbnail image constructed by the moving image files 301 to 304. Thumbnail images 803 and 804 are thumbnail images of each scene constructed by the moving image files 305 and 306, respectively.

Subsequently, by operating the operation unit 103, the user selects a desired representative image from representative images displayed on the index screen and instructs the reproduction (S602). When a reproducing instruction is output, the control unit 102 instructs the recording reproducing unit 106 so as to reproduce the moving image file of the scene corresponding to the selected representative image. In the case where the scene selected by the user is constructed by a plurality of moving image files, the control unit 102 instructs the recording reproducing unit 106 so as to reproduce the top moving image file. The recording reproducing unit 106 reproduces the designated moving image file from the recording medium 108 (S603). The signal processing unit 104 decodes the reproduced moving image file, displays onto the display unit 109, and outputs to the outside by the output unit 107.

The control unit 102 discriminates whether or not the moving image files are reproduced up to the end (S604). If the moving image files are not reproduced yet up to the end, the control unit 102 discriminates whether or not a reproduction stop instruction is output (S605). If the reproduction stop instruction is not output, the reproduction of the moving image is continued as it is. If the reproduction stop instruction is output, the control unit 102 instructs the recording reproducing unit 106 so as to stop the reproduction of the moving image file. The recording reproducing unit 106 stops the reproduction of the moving image file (S606). The control unit 102 displays the index screen onto the display unit 109 again.

If the moving image files are reproduced up to the end in S604, the control unit 102 confirms the NID of the moving image file being reproduced and discriminates whether or not a predetermined value "0" is stored in the NID (S607). If "0" is stored in the NID, since the reproduced file is an end file of the scene recorded by the recording of one time, the control unit 102 instructs the recording reproducing unit 106 so as to stop the reproduction of the moving image file. The recording reproducing unit 106 stops the reproduction of the moving image file (S606). The control unit 102 displays the index screen onto the display unit 109 again.

When the NID is not equal to "0", the control unit 102 discriminates whether or not the moving image file in which the same value as that of the NID of the moving image file being reproduced is stored in the UID is recorded in the recording medium 108 (S608). If the moving image file corresponding to the NID is recorded, the control unit 102 selects the next moving image file corresponding to the NID (S609) and reproduces this moving image file (S603). If the moving image file corresponding to the NID is not recorded, the control unit 102 instructs the recording reproducing unit 106 so as to stop the reproduction of the moving image file. The recording reproducing unit 106 stops the reproduction of the moving image file (S606). The control unit 102 displays the index screen onto the display unit 109 again.

Editing Operation

Figure 7:
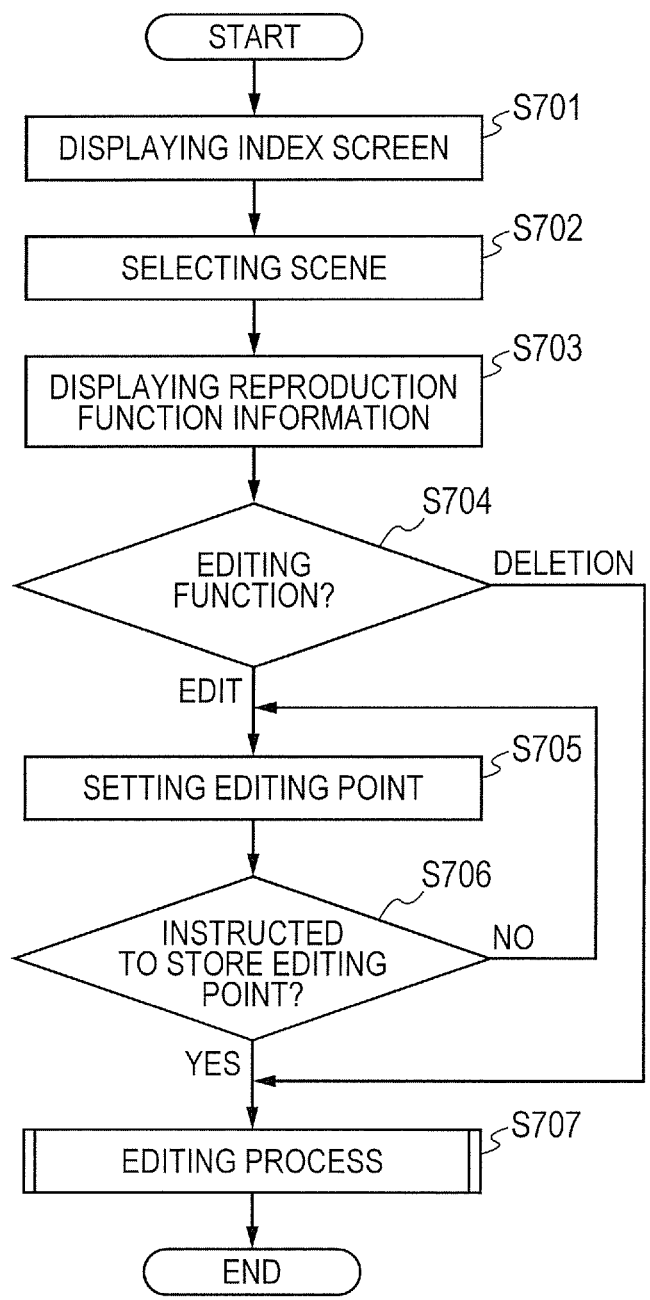
FIG. 7 is a diagram illustrating a flowchart for the editing operation according to the first embodiment of the invention.
Figure 11:
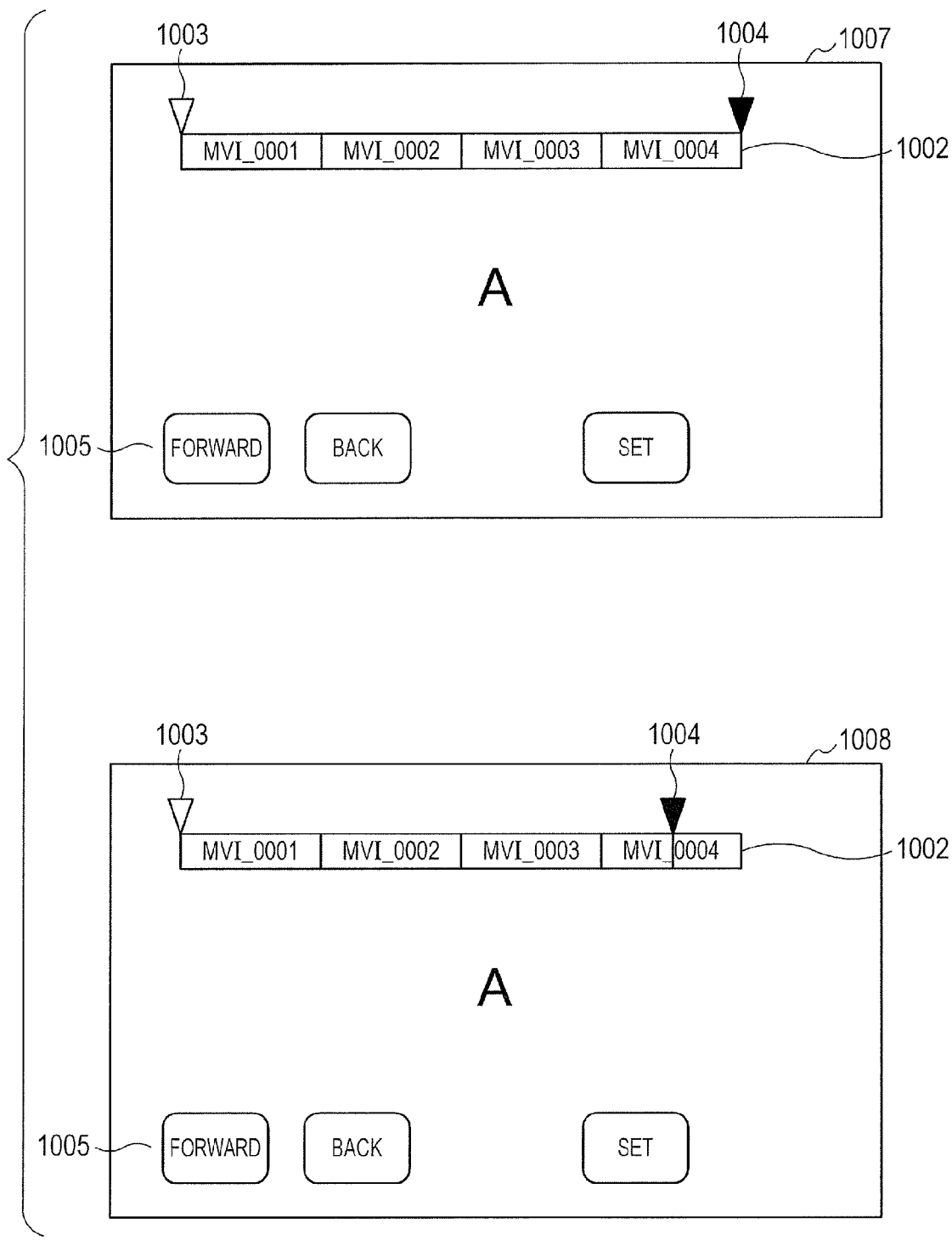
FIG. 11 is a diagram illustrating a display screen in the editing operation according to the first embodiment of the invention.

Subsequently, the editing operation will be described. FIGS. 7 and 11 illustrate flowcharts for the editing operation in the embodiment. First, when there is a reproducing mode change-over instruction by the operation unit 103, the control unit 102 reads out the thumbnail image data of each scene by a process similar to that of S601 of the foregoing reproducing operation and displays the index screen onto the display unit 109 (S701).

It is assumed here that the six moving image files 301 to 306 illustrated in FIG. 3 are recorded in the recording medium 108. File names and identification information of the moving image files 301 to 304 among the six moving image files are shown in 1301 in FIG. 13. Values of the UID, NID, and PID of each moving image file are the same as the values shown in FIG. 3, respectively.

The control unit 102 controls the signal processing unit 104 and displays the index screen including the thumbnail images of the six moving image files onto the display unit 109. Subsequently, when the user selects one of the displayed thumbnail images by operating the operation unit 103, the control unit 102 instructs the recording reproducing unit 106 and the signal processing unit 104 so as to reproduce the top picture image of the selected moving image (S702). A display screen 805 in FIG. 8 is a screen which is displayed in S702. A description will be made hereinbelow on the assumption that the scene constructed by the moving image files 301 to 304 is selected. In the display screen 805, a top picture image of the moving image file 301 serving as a head of the scene is displayed as a still image.

Subsequently, when it is detected that the user instructs that a reproducing function is displayed on the screen by operating the operation unit 103, the control unit 102 displays the selecting screen of the reproducing function onto the display unit 109 (S703). A display screen 806 in FIG. 8 is the selecting screen of the reproducing function. In the selecting screen 806, buttons 807 showing the reproducing functions is displayed. The user designates one of the reproducing functions by operating the operation unit 103 and instructs functions such as reproduction, edition, deletion, and the like (S704).

For example, when the reproduction of the next scene or preceding scene is instructed, the control unit 102 displays the top picture image of the moving image file before or after the moving image file currently selected. If the deletion is instructed, the control unit 102 executes a deleting process of the scene being selected as will be described hereinafter. When the edition is instructed, an editing point of the selected moving image file is set by the user (S705).

Figure 9:
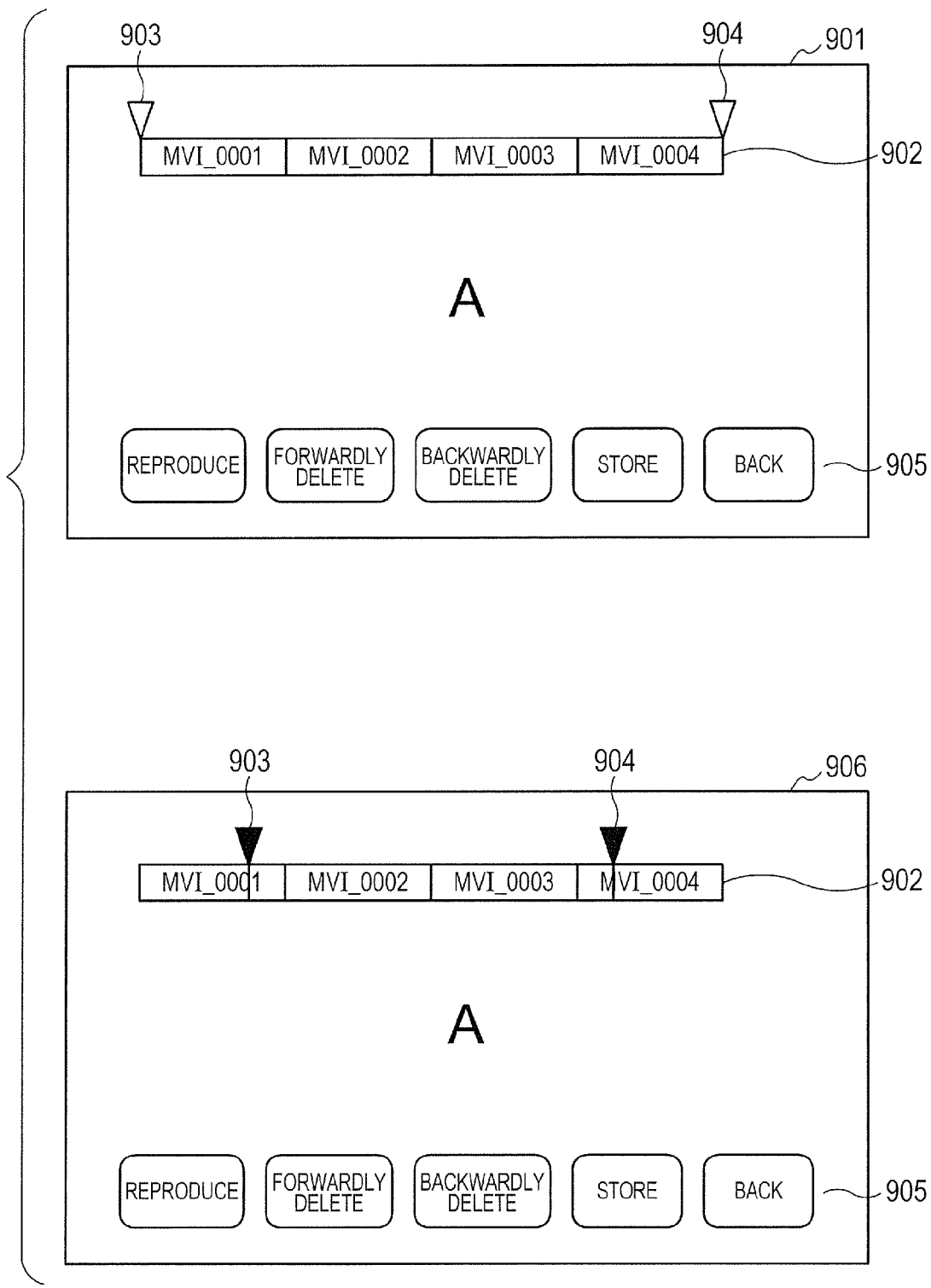
FIG. 9 is a diagram illustrating a display screen in the editing operation according to the first embodiment of the invention.

FIG. 9 illustrates a screen which is displayed when the editing function is designated. In FIG. 9, an editing screen 901 is a screen which is displayed just after the editing function is designated on the display screen 806. An editing screen 906 is a screen which is displayed in the case where a reproduction start position and a reproduction stop position are designated in the editing process. Information 902 showing the whole portion of the selected scene, information 903 showing the reproduction start position, and information 904 showing the reproduction stop position are displayed on the editing screen 901. The information 902 showing the whole portion of the selected scene, the information 903 showing the reproduction start position, and the information 904 showing the reproduction stop position are also similarly displayed on the editing screen 906. When the scene being selected includes a plurality of moving image files, as information 902 showing the whole scene, it is displayed so that the portion corresponding to each moving image file can be identified. In the editing screen 906, by changing a display format of the information 903 showing the reproduction start position and the information 904 showing the reproduction stop position, it is informed that the reproduction start position and the reproduction stop position are already set. In the present embodiment, as an editing function, there are: a forward deletion process as a process for deleting the data within a range from the head of the scene up to the reproduction start position set by the user; and a backward deletion process as a process for deleting the data within a range from the reproduction stop position set by the user up to the end of the scene.

When there is a forward deletion or backward deletion instruction in a state where the editing screen 901 is displayed, the control unit 102 displays a screen for a forward deletion editing and a screen for a backward deletion editing. The user designates the reproduction start position and the reproduction stop position by operating the operation unit 103.

Figure 10:
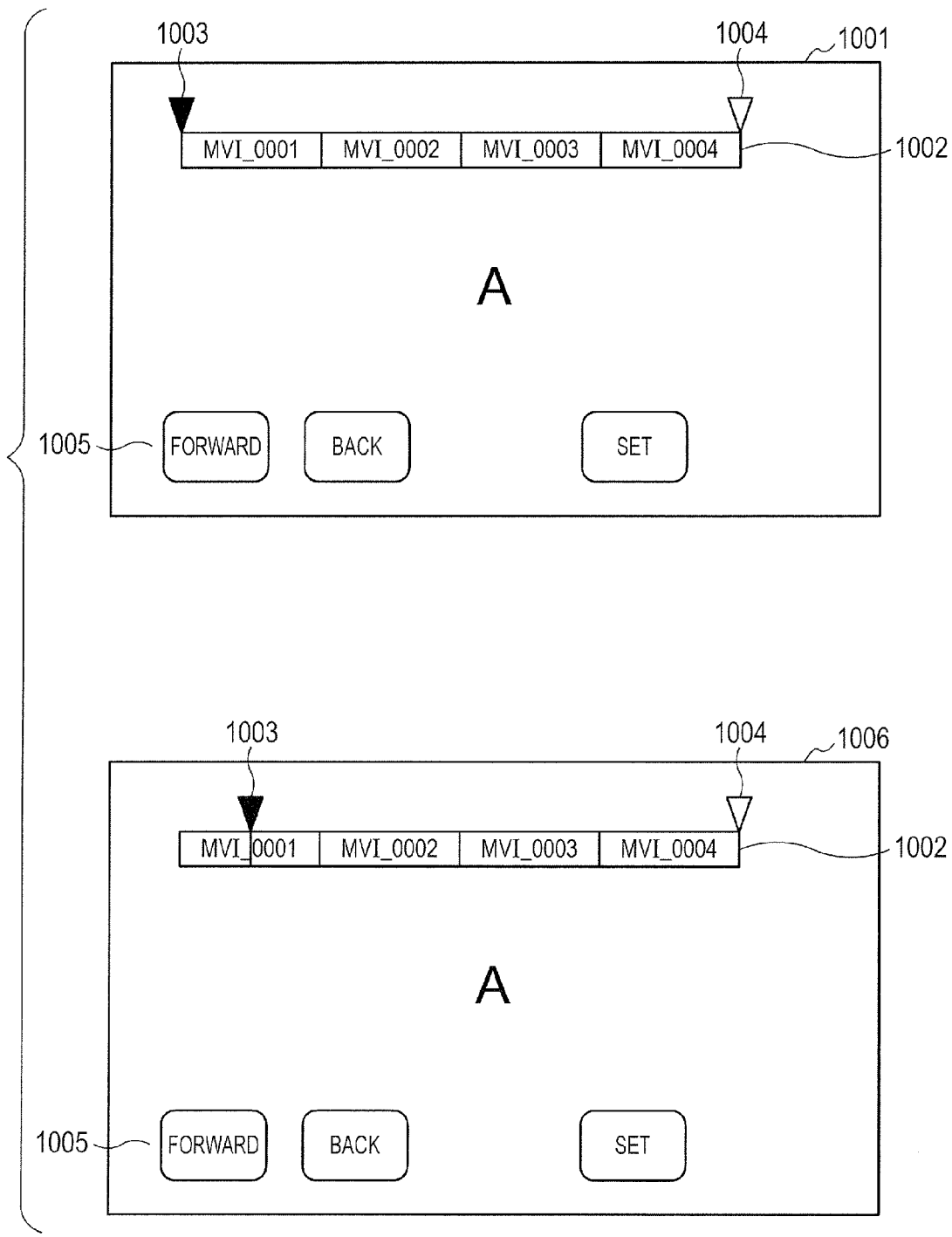
FIG. 10 is a diagram illustrating a display screen in the editing operation according to the first embodiment of the invention.

Display screens 1001 and 1006 for the forward deletion editing are illustrated in FIG. 10. Display screens 1007 and 1008 for the backward deletion editing are illustrated in FIG. 11. In FIGS. 10 and 11, information 1002 showing the whole portion of the selected scene, information 1003 showing the reproduction start position, and information 1004 showing the reproduction stop position are displayed. A button 1005 to change and set the reproduction start position or the reproduction stop position is also displayed.

In the case where the user instructs the reproduction in a state where the editing screen 901 or 906 is displayed, the control unit 102 reproduces the moving images within a range from the reproduction start position up to the reproduction start position in the selected scene and displays the reproduced moving images onto the display unit 109. When the preservation of an editing point is instructed, the control unit 102 stores the set editing point and information of a type of edition into the memory 105 (S706).

When the deletion or edition is instructed by the user, the control unit 102 executes the editing operation (S707).

Figure 12:
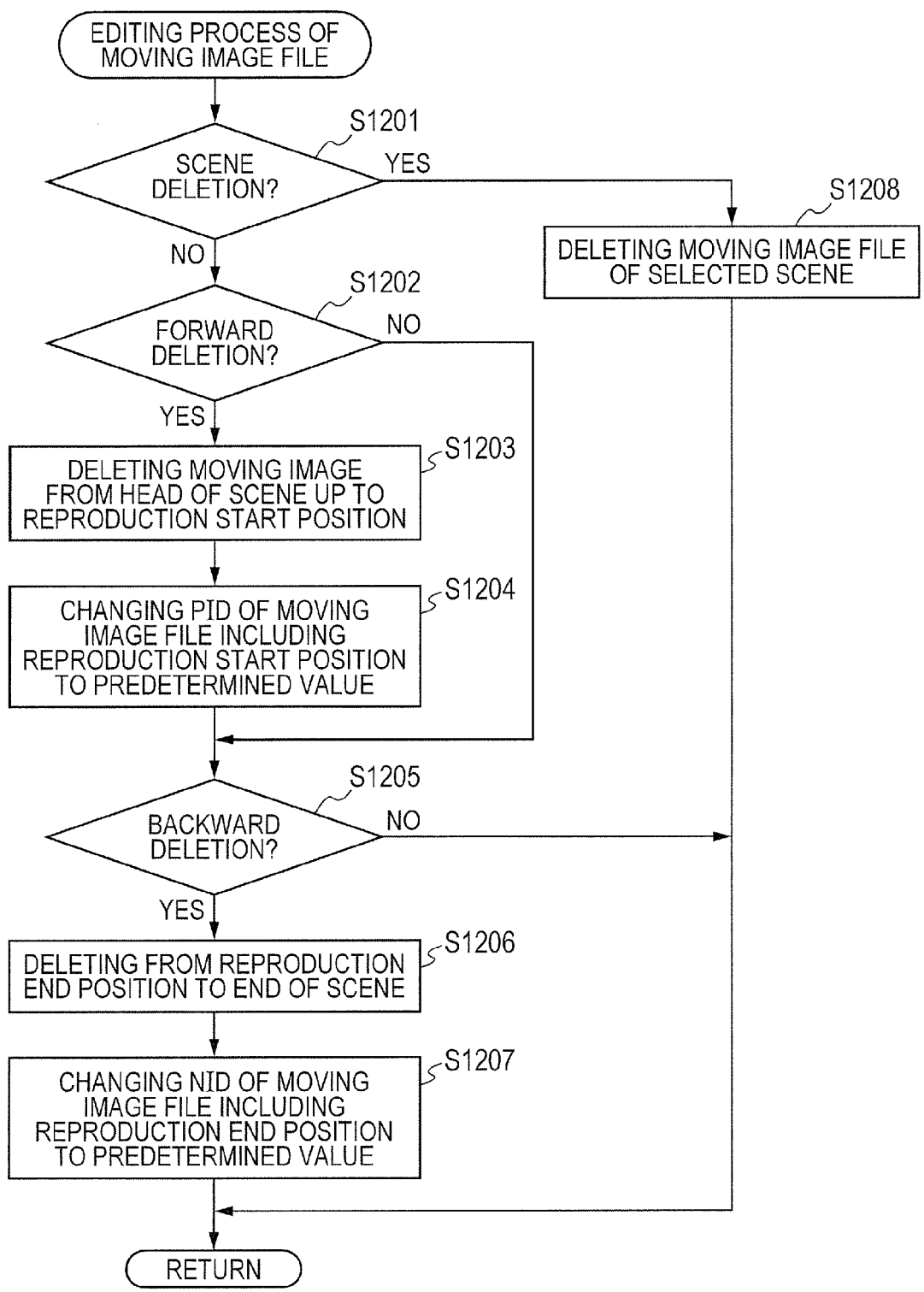
FIG. 12 is a diagram illustrating a flowchart for the editing operation according to the first embodiment of the invention.

FIG. 12 illustrates a flowchart for the editing operation of moving images. First, the control unit 102 discriminates whether or not the deletion of the scene is instructed (S1201). If the deletion of the scene is instructed, the control unit 102 instructs the recording reproducing unit 106 so as to delete all of the moving image files corresponding to the selected scene from the recording medium 108 (S1208). If the deletion of the scene is not instructed, the process is the forward deletion editing or the backward deletion editing. Therefore, the control unit 102 discriminates whether or not the reproduction start position is changed by the forward deletion process (S1202).

If the forward deletion process is executed, the control unit 102 deletes the moving images within a range from the head of the selected scene up to the reproduction start position from the recording medium 108 (S1203). For example, if the selected scene includes a plurality of files and a forwardly-continuous moving image file of the moving image file including the reproduction start position is recorded, the control unit 102 deletes the moving image data within a range from the top moving image file of the scene up to the file just before the moving image file including the reproduction start position. Further, the control unit 102 deletes the moving image data within a range from the head of the moving image file including the reproduction start position up to the reproduction start position.

In the selected scene, if the forwardly-continuous moving image file of the moving image file including the reproduction start position is not recorded, the control unit 102 deletes the moving image data within a range from the head of the moving image file including the reproduction start position up to the reproduction start position.

Subsequently, the control unit 102 changes the identification information of the moving image file including the reproduction start position (S1204). Specifically speaking, in the case of the forward deletion process, the control unit 102 changes the PID of the moving image file including the reproduction start position to the predetermined value "0".

The control unit 102 discriminates whether or not the reproduction end position is changed due to the backward deletion process (S1205). If the backward deletion process is executed, the control unit 102 deletes the moving images within a range from the reproduction end position of the selected scene up to the end of the scene from the recording medium 108 (S1206). For example, in the case where the selected scene includes a plurality of files and the continuous moving image is recorded after the moving image file including the reproduction end position, the control unit 102 deletes the moving image data within a range from the next file of the moving image file including the reproduction end position up to the end file of the scene. Further, the control unit 102 deletes the moving image data within a range from the reproduction end position of the moving image file including the reproduction end position up to the end.

In the selected scene, if the next-continuous moving image file of the moving image file including the reproduction end position is not recorded, the control unit 102 deletes the moving image data within a range from the reproduction end position of the moving image file including the reproduction end position up to the end.

Subsequently, the control unit 102 changes the identification information of the moving image file including the reproduction end position (S1207). Specifically speaking, in the case of the backward deletion process, the control unit 102 changes the NID of the moving image file including the reproduction end position to the predetermined value "0".

Identification information of the case where the forward deletion process of a scene constructed by four moving image files shown at 1301 in FIG. 13 is executed and the reproduction start position is set on the way of the moving image file 302 is shown at 1302 in FIG. 13. In this case, the forwardly-continuous moving image file 301 of the moving image file 302 including the reproduction start position is deleted. The control unit 102 changes the PID of the moving image file 302 including the reproduction start position to a predetermined value "0000".

Identification information of the case where the backward deletion process of the scene constructed by the four moving image files shown at 1301 in FIG. 13 is executed and the reproduction end position is set on the way of the moving image file 303 is shown at 1303 in FIG. 13. In this case, the next-continuous moving image file 304 of the moving image file 303 including the reproduction end position is deleted. The control unit 102 changes the NID of the moving image file 303 including the reproduction end position to the predetermined value "0000".

Identification information of the case where the forward deletion process and the backward deletion process of the scene constructed by those four moving image files are executed, the reproduction start position is set on the way of the moving image file 302, and the reproduction end position is set on the way of the moving image file 303 is shown at 1304 in FIG. 13. In this case, the forwardly-continuous moving image file 301 of the moving image file 302 including the reproduction start position and the next-continuous moving image file 304 of the moving image file 303 including the reproduction end position are deleted. The control unit 102 changes the PID of the moving image file 302 including the reproduction start position to the predetermined value "0000" and changes the NID of the moving image file 303 including the reproduction end position to the predetermined value "0000".

In this manner, in the present embodiment, if a plurality of moving image files are recorded during the recording of one time, the identification information of the immediately-preceding and immediately-following files are stored as identification information of the moving image files into the files and recorded. Therefore, in reproduction, a fact that the files are the moving image files recorded in the recording of one time can be easily recognized.

By detecting the moving image files corresponding to one scene recorded in the recording of one time on the basis of those identification information and continuously reproducing them, the moving image files generated during the recording of one time can be continuously reproduced.

In the present embodiment, in the case where the editing operation for deleting a part of the data such as forward deletion process, backward deletion process, or the like of the selected scene is executed, the identification information is changed in accordance with the contents of the editing process. Therefore, after the editing, the deleted moving image file is not designated as an immediately-preceding or next-continuous moving image file. Thus, even after the editing operation, a fact that the files are the moving image files recorded in the recording of one time can be recognized.

Although the threshold value adapted to divide the file is set to the predetermined size in the present embodiment, for example, the file may be divided each time the moving image data of an amount corresponding to a predetermined time is recorded. In this case, the threshold value is a predetermined recording time length. The control unit 102 forms a new file, counts an elapsed time from the recording start, and outputs a file division instruction to the recording reproducing unit 106 after the elapse of the predetermined time. Although the apparatus for recording the moving image data and audio data is described in the present embodiment, the invention can be also similarly applied to an apparatus for recording other information data which is input.

Although the moving images and audio are recorded in the MP4 file format in the embodiment, they can be also recorded in another file format.

Although the present embodiment is constructed in such a manner that in reproduction, the moving image files formed during the recording of one time are continuously reproduced, it may be constructed in such a manner that in the case where one moving image file is reproduced up to the end, the next moving image is not reproduced but the index screen is displayed.

Second Embodiment

Subsequently, the second embodiment of the invention will be described. Also in this embodiment, a construction and the fundamental operation of the recording apparatus 100 are similar to those in the first embodiment. Although the various kinds of identification information shown in FIG. 5 are recorded also in the second embodiment, in this embodiment, as a PID of each moving image file which is recorded upon photographing, a predetermined value showing invalidity, for example, "−1" is stored and recorded. On the other hand, with respect to the UID and NID, they are recorded in a manner similar to the first embodiment. Thus, according to this embodiment, the reproducing operation and the editing operation which do not use the information PID for identifying the forwardly-continuous file can be realized.

Recording Operation

Figure 14:
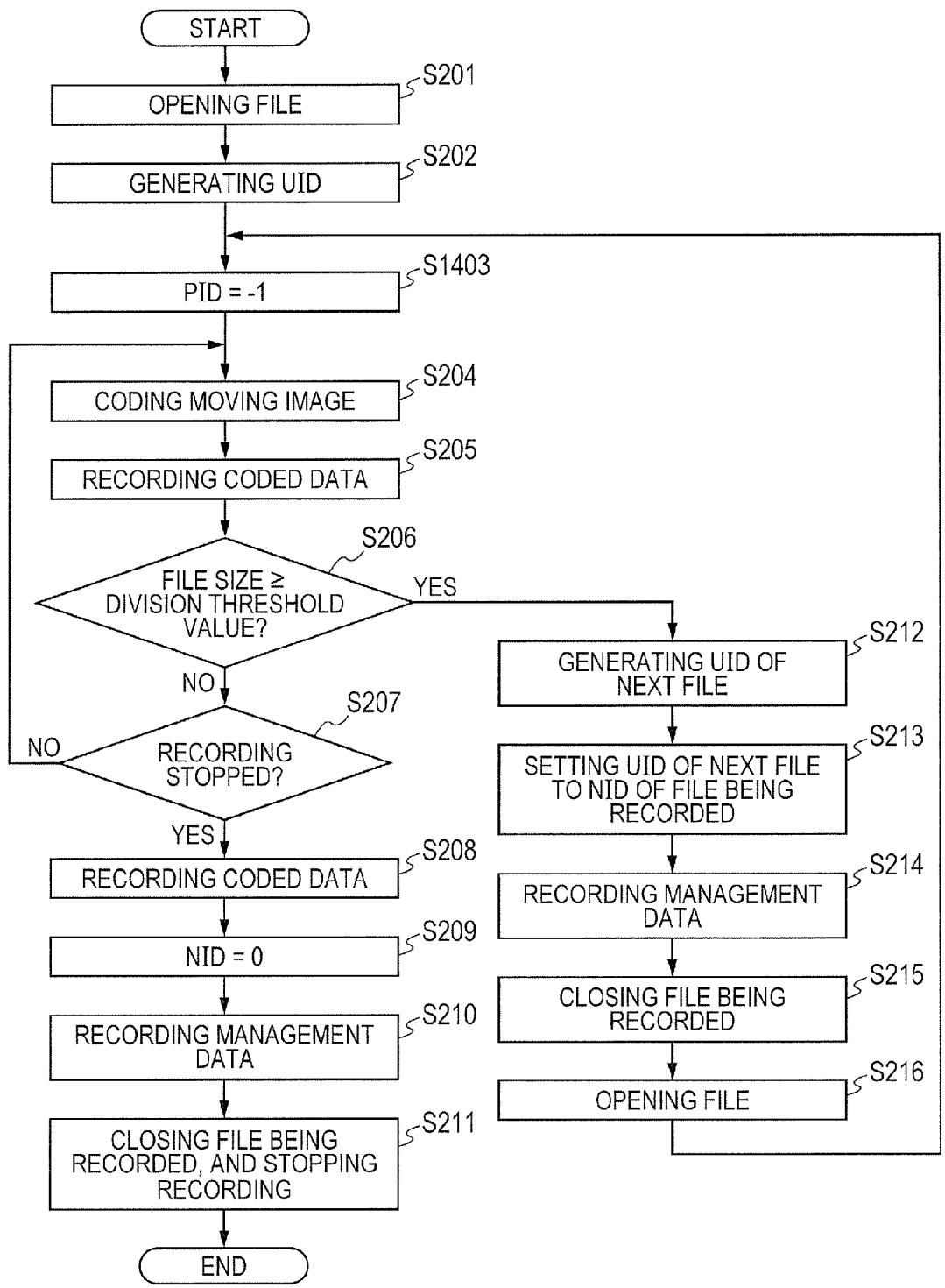
FIG. 14 is a diagram illustrating a flowchart for the recording operation according to the second embodiment of the invention.

FIG. 14 illustrates a flowchart for the recording operation in the second embodiment. In FIG. 14, processes similar to those in FIG. 2 are designated by the same step numbers and their detailed description is omitted here. The process of FIG. 14 is executed by a method whereby the control unit 102 controls each unit.

The process of FIG. 14 differs from that of FIG. 2 with respect to a point that a predetermined value (−1) showing invalidity is set as a PID in S1403. After a file is newly formed in S216, the processing routine is returned to S1403 and the predetermined value (−1) showing invalidity is set as a PID. Other processes are similar to those in the first embodiment.

Figure 15:
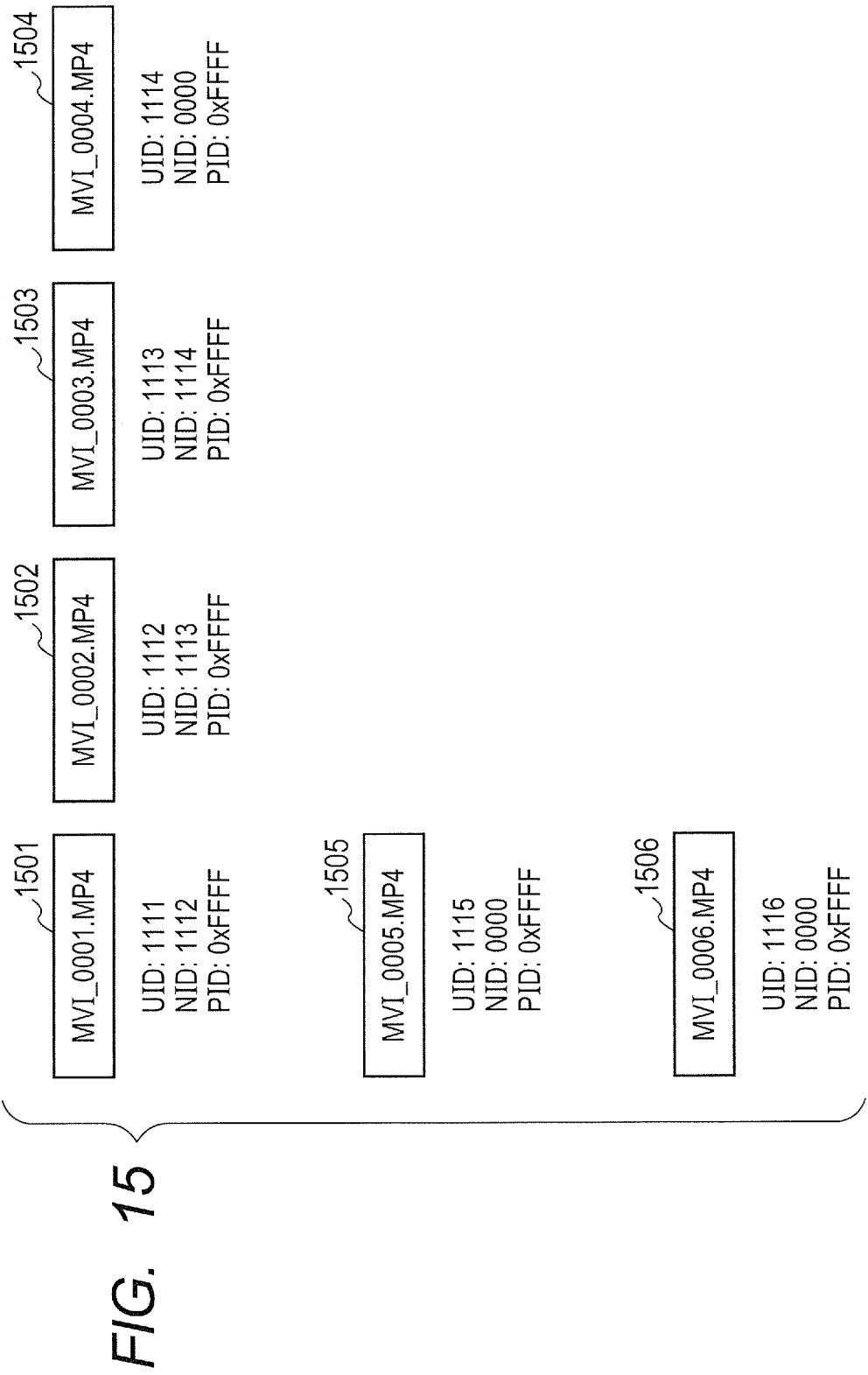
FIG. 15 is a diagram illustrating states of moving image files according to the second embodiment of the invention.

FIG. 15 is a diagram illustrating the contents of moving image files which are recorded into the recording medium by the recording apparatus of the second embodiment. Moving image files 1501 to 1504 in FIG. 15 are moving image files recorded for a period of time from the recording start instruction to the recording stop instruction. The moving image file 1501 is formed in accordance with the recording start. When a size of the moving image file 1501 reaches the file division threshold value, the file 1501 is closed and the file 1502 is newly formed. For example, "1111" is stored as a UID of the file 1501 and "1112" as a UID of the next file 1502 is stored into the NID. When a size of the moving image file 1502 reaches the file division threshold value, the file 1502 is closed and the file 1503 is newly formed. "1113" as a UID of the file 1503 is stored into the NID of the file 1502. When a size of the moving image file 1503 reaches the file division threshold value, the file 1503 is closed and the file 1504 is newly formed. "1114" as a UID of the file 1504 is stored into the NID of the file 1503. When there is a recording stop instruction during the recording of the moving image file 1504, since the file 1504 is an end file in the recording of one time, "0" is stored as an NID. A value "−1" (hexadecimal number with a sign) showing invalidity is recorded as a PID of each file.

Moving image files 1505 and 1506 are moving image files of the case where a plurality of moving image files are not recorded for a period of time from the recording start instruction to the recording stop instruction. "1115" and "1116" are stored as a UID of the moving image files 1505 and 1506 and "0" (0000) is stored into the NID. The value "−1" (hexadecimal number with a sign) showing invalidity is recorded as a PID of each file.

Reproducing Operation

Subsequently, the operation in reproduction will be described. In the first embodiment, the file in which "0" is recorded in the PID is a top file recorded by the recording of one time. On the other hand, in the second embodiment, since the PID is invalid, first, the control unit 102 confirms the UID and NID of each of the recorded moving image files in order of the file numbers. The control unit 102 assumes that the files within a range from the file next to the file in which "0" is recorded in the NID to the file in which the NID is subsequently equal to "0" are the files recorded by the recording of one time. The control unit 102 displays the index screen showing the representative image of each scene. The subsequent operation is similar to that in the first embodiment.

It is also possible to construct in such a manner that in reproduction, a plurality of moving image files recorded by the recording of one time are confirmed from the values of the UID and NID of each file without using the file numbers and their reproducing order is determined.

As mentioned above, according to the present embodiment, if a plurality of moving image files are recorded during the recording of one time, the identification information of the immediately-following file is stored into the moving image file and recorded. Therefore, a fact that the files are the moving image files recorded in the recording of one time can be easily recognized.

Although the value showing invalidity is recorded as a PID in the second embodiment, it is also possible to construct in such a manner that the user can select either a mode in which the PID is recorded or a mode in which the PID is invalidated as in the first embodiment.

Editing Operation

Subsequently, the operation upon editing will be described. Also in the second embodiment, three processes such as file deletion, forward deletion process, and backward deletion process can be performed as an editing process, and the editing operation is executed in accordance with flowcharts of FIGS. 7 and 16. In the second embodiment, the editing operation in S707 differs from the first embodiment.

Figure 16:
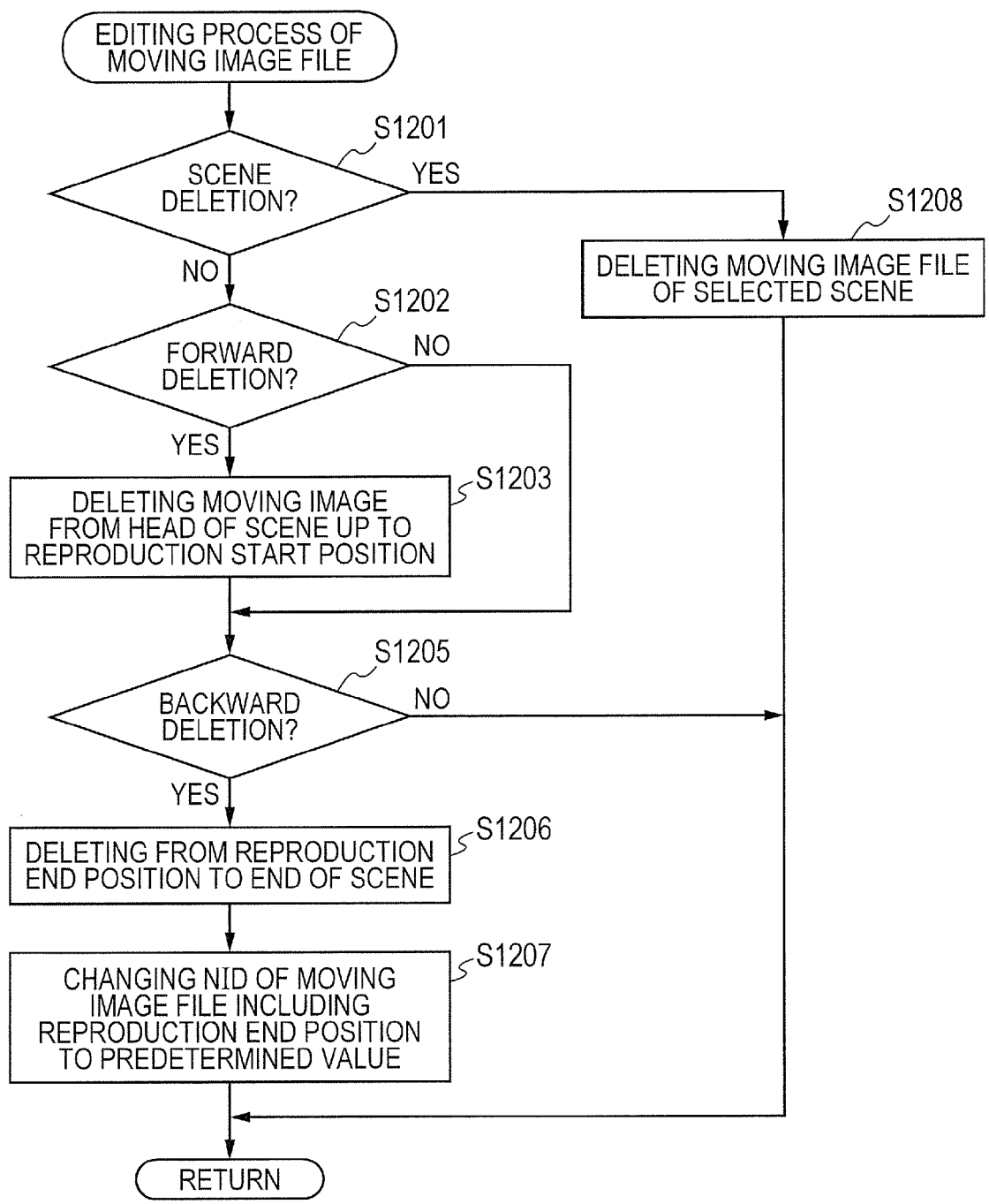
FIG. 16 is a diagram illustrating a flowchart for the editing operation according to the second embodiment of the invention.

FIG. 16 illustrates the flowchart for the editing operation in S707 in the second embodiment. In FIG. 16, substantially the same operations as those in FIG. 12 are designated by the same step numbers. In the second embodiment, since the PID of the moving image file of an editing target is set to the invalid value, the changing process of the PID in S1204 is deleted.

In S1203, the control unit 102 confirms whether or not there is a forwardly-continuous moving image file of the moving image file including the reproduction start position on the basis of the NID of each moving image file and the UID of the moving image file including the reproduction start position. The control unit 102 detects the moving image file in which the value of the UID of the moving image file including the reproduction start position is set as an NID. If the moving image file in which the value of the UID of the moving image file including the reproduction start position is set as an NID is recorded, the control unit 102 similarly detects the forwardly-continuous file of such a moving image file. Other operations are similar to those of FIG. 12.

The file names and identification information of the moving image files 1501 to 1504 among those six moving image files are shown at 1701 in FIG. 17. The values of the UID, NID, and PID of each moving image file are the same as those shown in FIG. 3.

Identification information in the case where the forward deletion process of a scene constructed by the four moving image files shown at 1701 in FIG. 17 is executed and the reproduction start position is set on the way of the moving image file 1502 is shown at 1702 in FIG. 17. In this case, the forwardly-continuous moving image file 1501 of the moving image file 1502 including the reproduction start position is deleted.

Identification information in the case where the backward deletion process of the scene constructed by the four moving image files shown at 1701 in FIG. 17 is executed and the reproduction end position is set on the way of the moving image file 1503 is shown at 1703 in FIG. 17. In this case, the next-continuous moving image file 1504 of the moving image file 1503 including the reproduction end position is deleted. The control unit 102 changes the NID of the moving image file 1503 including the reproduction end position to the predetermined value "0000".

Identification information in the case where the forward deletion process and the backward deletion process of the scene constructed by those four moving image files are executed, the reproduction start position is set on the way of the moving image file 1502, and the reproduction end position is set on the way of the moving image file 1503 is shown at 1704 in FIG. 17. In this case, the forwardly-continuous moving image file 1501 of the moving image file 1502 including the reproduction start position and the next continuously-following moving image file 1504 of the moving image file 1503 including the reproduction end position are deleted. The control unit 102 changes the NID of the moving image file 1503 including the reproduction end position to the predetermined value "0000".

As mentioned above, in the present embodiment, identification information showing the moving image file of immediately before and the next moving image file is recorded as identification information of a plurality of moving image files formed during the recording of one time. In reproduction, the moving image files corresponding to the scene recorded by the recording of one time are determined on the basis of those identification information and are continuously reproduced. Therefore, the moving image files formed during the recording of one time can be continuously reproduced.

In the present embodiment, in the case where the editing process such as deletion of any one of the moving image files, deletion of a part of them, or the like is executed, the identification information is changed in accordance with the contents of the editing process. Therefore, after the editing, since the moving images are not continuously reproduced at positions before and after the deleted portion, such a situation that the moving images in which the continuity has disappeared due to the editing process are continuously reproduced can be prevented.

According to the invention, when a plurality of moving image files are formed during the recording of one scene and the association among those files is further set as association information, the identification information to identify the association can be held and updated upon editing and the continuous reproduction and combining process after the editing can be easily performed.

Other Embodiments

Each unit constructing the recording apparatus in the embodiments of the invention mentioned above and each processing step of the recording method can be realized by a method whereby the program stored in the RAM, ROM, or the like of the computer operates. The program and a computer-readable storage medium in which the program has been stored are incorporated in the invention.

The invention can be also embodied as, for example, a system, an apparatus, a method, a program, a storage medium, or the like. Specifically speaking, the invention can be also applied to a system constructed by a plurality of apparatuses or to an apparatus constructed by one equipment.

The invention incorporates a case where a program of software for realizing the functions of the embodiments as mentioned above (program corresponding to the flowchart illustrated in FIG. 2 in the embodiments) is directly supplied to a system or apparatus or is supplied from a remote place. The invention also incorporates a case where a computer of the system or apparatus reads out and executes a program code of the supplied program.

Therefore, the program code itself which is installed into the computer in order to realize the functions and processes of the invention by the computer also realizes the invention. That is, a computer program itself for realizing the functions and processes of the invention is also incorporated in the invention. In this case, any form such as object code, program which is executed by an interpreter, script data which is supplied to the OS, or the like may be used so long as it has the functions of the program.

As a storage medium for supplying the program, for example, there is a flexible disk, a hard disk, an optical disk, a magnetooptic disk, or the like. Further, there is an MO, a CD-ROM, a CD-R, a CD-RW, a magnetic tape, a nonvolatile memory card, a ROM, a DVD (DVD-ROM, DVD-R), or the like.

As another program supplying method, there is a method whereby a computer is connected to Homepage of the Internet by using a browser of a client computer. The program can be also supplied by supplying the computer program itself of the invention from Homepage or by downloading a compressed file including an automatic installing function into a storage medium such as a hard disk or the like.

The program supplying method can be also realized by a method whereby the program code constructing the program of the invention is divided into a plurality of files and each file is downloaded from different Homepage. That is, a WWW server for allowing a plurality of users to download a program file for realizing the functions and processes of the invention by the computer is also incorporated in the invention.

As another method, the program supplying method can be also realized by a method whereby the program of the invention is encrypted, stored into the storage medium such as a CD-ROM or the like, and distributed to the users, the users who cleared predetermined conditions are allowed to download key information for decrypting the encryption from Homepage through the Internet, and by using the key information, the encrypted program is executed and installed into the computer.

The functions of the embodiments mentioned above are realized by a method whereby the computer executes the read-out program. Further, the functions of the embodiments mentioned above are also realized by a method whereby the OS or the like which operates on the computer executes a part or all of actual processes on the basis of instructions of the program, and those functions are realized by those processes.

Further, as another method, the functions of the embodiments mentioned above are also realized by a method whereby the program which is read out of the storage medium is written into a memory provided for a function expanding board inserted in a computer or a function expanding unit connected to the computer, a CPU or the like provided for the function expanding board or function expanding unit executes a part or all of actual processes on the basis of instructions of the program, and those functions are realized by those processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-248415 filed on Nov. 12, 2012, which is hereby incorporated by reference herein in its entirety.

What is claimed is:

1. An image processing apparatus comprising:
a processing unit configured to edit moving image data in scene units,
wherein the scene includes a plurality of moving image files each including moving image data and identification information relating to continuity between the moving image file and another moving image file,
wherein the processing unit performs an editing process for deleting a portion of the moving image data from a head of one scene,
wherein a portion of the moving image data, which is included in a predetermined moving image file among the plurality of moving image files of the one scene, is deleted in accordance with the editing process for deleting the portion of the moving image data from the head of the one scene; and
a control unit configured to change, in accordance with the editing process for deleting the portion of the moving image data from the head of the one scene, the identification information of the predetermined moving image file of the one scene such that it is discriminated that there is no moving image file which has continuity forwardly with the predetermined moving image file.

2. An apparatus according to claim 1, further comprising:
a designation unit configured to designate an editing point in the one scene,
wherein the processing unit deletes the moving image data from the head to the editing point of the one scene.

3. An apparatus according to claim 2, wherein
the control unit changes the identification information of the moving image file which includes the editing point.

4. An apparatus according to claim 1, further comprising:
a selection unit configured to select a scene to be edited from a plurality of scenes in accordance with an instruction of a user, and
wherein the processing unit performs the editing process on the scene selected by the selection unit.

5. An apparatus according to claim 1, further comprising:
a detection unit configured to detect the moving image file which is included in the one scene in accordance with the identification information.

6. An apparatus according to claim 1, wherein the identification information of each of the plurality of moving image files includes first information for discriminating a moving image file which continues forwardly and second information for discriminating a moving image file which continues backwardly, and
wherein the control unit changes the first information included in the identification information of the predetermined moving image file such that it is discriminated that there is no moving image file which has continuity forwardly with the predetermined moving image file.

7. An apparatus according to claim 6, further comprising:
a recording unit that records moving image file including moving image data and the identification information on a recording medium,
wherein the control unit sets the first information of the identification information included in the first moving image file among a plurality of moving image files of one scene recorded from a recording start instruction to a recording stop instruction to a value indicating that there is no moving image file which has continues forwardly, and sets the second information of the identification information of the last moving image file among the plurality of moving image files recorded from the recording start instruction to the recording stop instruction to a value indicating that there is no moving image file which continues backwardly.

8. An image processing apparatus comprising:
a processing unit configured to edit moving image data in scene units,
wherein the scene includes a plurality of moving image files each including moving image data and identification information relating to continuity between the moving image file and another moving image file,
wherein the processing unit performs an editing process for deleting a portion of the moving image data from an end of one scene,
wherein a portion of the moving image data, which is included in a predetermined moving image file among the plurality of moving image files of the one scene, is deleted in accordance with the editing process for deleting the portion of the moving image data from the end of the one scene; and
a control unit configured to change, in accordance with the editing process for deleting the portion of the moving image data from the end of the one scene, the identification information of the predetermined moving image file of the one scene such that it is discriminated that there is no moving image file which has continuity backwardly with the predetermined moving image file.

9. An apparatus according to claim 8, further comprising:
a designation unit configured to designate an editing point in the one scene,
wherein the processing unit deletes the moving image data from the end of the one scene to the editing point.

10. An apparatus according to claim 8, further comprising:
a selection unit configured to select a scene to be edited from a plurality of scenes in accordance with an instruction of a user, and
wherein the processing unit performs the editing process on the scene selected by the selection unit.

11. An apparatus according to claim 8, further comprising:
a detection unit configured to detect the moving image file which is included in the one scene in accordance with the identification information.

12. An apparatus according to claim 8, wherein the identification information of each of the plurality of moving image files includes first information for discriminating a moving image file which continues forwardly and second information for discriminating a moving image file which continues backwardly, and
wherein the control unit changes the first information included in the identification information of the predetermined moving image file such that it is discriminated that there is no moving image file which has continuity forwardly with the predetermined moving image file.

13. An apparatus according to claim 12, further comprising:
a recording unit that records moving image file including moving image data and the identification information on a recording medium,
wherein the control unit sets the first information of the identification information included in the first moving image file among a plurality of moving image files of one scene recorded from a recording start instruction to a recording stop instruction to a value indicating that there is no moving image file which has continues forwardly, and sets the second information of the identification information of the last moving image file among the plurality of moving image files recorded from the recording start instruction to the recording stop instruction to a value indicating that there is no moving image file which continues backwardly.

14. An image processing method comprising:
editing moving image data in scene units,
wherein the scene includes a plurality of moving image files each including moving image data and identification information relating to continuity between the moving image file and another moving image file,
wherein the editing performs an editing process for deleting a portion of the moving image data from a head of one scene,
wherein a portion of the moving image data, which is included in a predetermined moving image file among the plurality of moving image files of the one scene, is deleted in accordance with the editing process for deleting the portion of the moving image data from the head of the one scene; and
changing, in accordance with the editing process for deleting the portion of the moving image data from the head of the one scene, the identification information of the predetermined moving image file of the one scene such that it is discriminated that there is no moving image file which has continuity forwardly with the predetermined moving image file.

15. An image processing method comprising:
editing moving image data in scene units,
wherein the scene includes a plurality of moving image files each including moving image data and identification information relating to continuity between the moving image file and another moving image file,
the editing performs an editing process for deleting a portion of the moving image data from an end of one scene,
wherein a portion of the moving image data, which is included in a predetermined moving image file among the plurality of moving image files of the one scene, is deleted in accordance with the editing process for deleting the portion of the moving image data from the end of the one scene; and
changing, in accordance with the editing process for deleting the portion of the moving image data from the end of the one scene, the identification information of the predetermined moving image file of the one scene such that it is discriminated that there is no moving image file which has continuity backwardly with the predetermined moving image file.

* * * * *